United States Patent
Chinnaiah Sankaran et al.

(10) Patent No.: US 9,634,944 B2
(45) Date of Patent: Apr. 25, 2017

(54) MULTI-LEVEL ISCSI QOS FOR TARGET DIFFERENTIATED DATA IN DCB NETWORKS

(71) Applicant: Dell Products, LP, Round Rock, TX (US)

(72) Inventors: Ananda M. Chinnaiah Sankaran, Round Rock, TX (US); Anoop Ghanwani, Rocklin, CA (US)

(73) Assignee: Dell Products, LP, Round Rock, TX (US)

( * ) Notice: Subject to any disclaimer, the term of this patent is extended or adjusted under 35 U.S.C. 154(b) by 167 days.

(21) Appl. No.: 14/062,446

(22) Filed: Oct. 24, 2013

(65) Prior Publication Data
US 2015/0117199 A1    Apr. 30, 2015

(51) Int. Cl.
*H04L 12/28* (2006.01)
*H04L 12/851* (2013.01)
(Continued)

(52) U.S. Cl.
CPC ...... *H04L 47/2433* (2013.01); *H04L 12/5689* (2013.01); *H04L 29/0653* (2013.01);
(Continued)

(58) Field of Classification Search
CPC ............... H04L 12/5689; H04L 12/569; H04L 2012/5629; H04L 2012/5631; H04L 2012/5632; H04L 2012/5638; H04L 2012/5646; H04L 2012/5651; H04L 29/06027; H04L 29/06523; H04L 29/0653; H04L 29/08549; H04L 29/08711; H04L 29/08954; H04L 41/5022; H04L 47/24; H04L 47/2425; H04L 47/2433;
(Continued)

(56) References Cited

U.S. PATENT DOCUMENTS 7,307,949 B1 * 12/2007 Washburn et al. ........... 370/230
7,590,775 B2     9/2009 Gildfind et al.
(Continued)

FOREIGN PATENT DOCUMENTS

WO     WO 2014/143133 A1    9/2014

OTHER PUBLICATIONS

"Media Access Control (MAC) Bridges and Virtual Bridged Local Area Networks—Amendment 17: Priority-based Flow Control", IEEE Std 802.1Qbb-™ 2011, Sep. 30, 2011.
(Continued)

*Primary Examiner* — Alpus H Hsu
(74) *Attorney, Agent, or Firm* — Hamilton, Brook, Smith & Reynolds, P.C.

(57) ABSTRACT

In an embodiment, a method can include setting metadata of a first data packet to have a first priority level based on a first internal classifier of the first data packet and setting metadata of a second data packet to have a second priority level based on a second internal classifier of the second data packet. The first data packet and second data packet can be of the same traffic type (e.g., iSCSI). The method can further include sub-classifying (e.g., the same traffic type), based on the first and second priority levels, to direct the first data packet into a first data channel and second data packet into a second data channel for the same traffic type.

15 Claims, 6 Drawing Sheets

(51) Int. Cl.
| | | |
|---|---|---|
| *H04L 29/06* | (2006.01) | |
| *G06F 15/173* | (2006.01) | |
| *H04L 12/54* | (2013.01) | |
| *H04L 29/08* | (2006.01) | |
| *H04L 12/927* | (2013.01) | |

(52) U.S. Cl.
CPC .... *H04L 29/08954* (2013.01); *H04L 47/2441* (2013.01); *H04L 47/805* (2013.01); *H04L 69/22* (2013.01); *H04L 67/1097* (2013.01)

(58) Field of Classification Search
CPC ..... H04L 47/2483; H04L 47/70; H04L 47/78; H04L 47/783; H04L 47/805; H04L 65/80; H04L 69/22
See application file for complete search history.

(56) References Cited

U.S. PATENT DOCUMENTS

| | | | | |
|---|---|---|---|---|
| 7,630,369 | B1* | 12/2009 | Overby et al. | 370/389 |
| 7,644,205 | B1* | 1/2010 | Overby et al. | 710/40 |
| 7,843,931 | B1* | 11/2010 | Anker et al. | 370/392 |
| 7,908,410 | B2 | 3/2011 | Gildfind et al. | |
| 8,194,593 | B2* | 6/2012 | Jing et al. | 370/328 |
| 8,203,950 | B2 | 6/2012 | Cometto et al. | |
| 8,504,690 | B2* | 8/2013 | Shah et al. | 709/226 |
| 8,537,706 | B2* | 9/2013 | Cardona et al. | 370/252 |
| 8,566,494 | B2* | 10/2013 | Li et al. | 710/263 |
| 8,761,174 | B2* | 6/2014 | Jing et al. | 370/392 |
| 8,780,923 | B2* | 7/2014 | Chawla et al. | 370/395.31 |
| 8,891,531 | B2* | 11/2014 | Dickens et al. | 370/395.5 |
| 2004/0064582 | A1* | 4/2004 | Raghunath et al. | 709/240 |
| 2005/0089054 | A1* | 4/2005 | Ciancaglini et al. | 370/412 |
| 2008/0177881 | A1 | 7/2008 | Endbrock et al. | |
| 2010/0165841 | A9 | 7/2010 | Barzilai et al. | |
| 2012/0066407 | A1* | 3/2012 | Andries et al. | 709/232 |
| 2012/0327774 | A1 | 12/2012 | Hernandez et al. | |
| 2012/0331227 | A1* | 12/2012 | Saripalli | 711/118 |
| 2013/0064096 | A1* | 3/2013 | Degioanni et al. | 370/241 |
| 2013/0117286 | A1 | 5/2013 | Gallant et al. | |
| 2013/0166773 | A1* | 6/2013 | Armstrong et al. | 709/234 |
| 2013/0243006 | A1* | 9/2013 | Otsuka | 370/401 |
| 2014/0059265 | A1* | 2/2014 | Iyer et al. | 710/313 |
| 2014/0281045 | A1 | 9/2014 | Chawla et al. | |
| 2014/0307555 | A1* | 10/2014 | DeCusatis et al. | 370/236 |
| 2015/0026313 | A1 | 1/2015 | Chawla et al. | |

OTHER PUBLICATIONS

"Media Access Control (MAC) Bridges and Virtual Bridged Local Area Networks—Amendment 18: Enhanced Transmission Selection for Bandwidth Sharing Between Traffic Classes" IEEE Std 802.1Qaz™ 2011, Sep. 30, 2011.

"Media Access Control (MAC) Bridges and Virtual Bridge Local Area Networks", IEEE Std 802.1Q™, Aug. 31, 2011.

* cited by examiner

MULTI-LEVEL ISCSI QOS FOR TARGET DIFFERENTIATED DATA IN DCB NETWORKS

BACKGROUND OF THE INVENTION

In Data Center Bridging (DCB) networks, Internet Small Computer System Interface (iSCSI), which can be typically identified by TCP port 3260 or TCP port 860, can be prioritized as a single traffic class with Quality of Service (QoS) properties such as allocated bandwidth and lossless-ness (e.g., a lossy or lossless connection). DCB networks can implement standards developed by IEEE 802.1. IEEE 802.1Q, for instance, provides mechanisms to provide or identify different priority level channels for different types of data. In some DCB implementations, priority 0 is used for LAN traffic, priority 3 is used for FibreChannel traffic, priority 4 is used for iSCSI traffic, priority 5 is used for Voice over Internet Protocol (VoIP) or Audio/Video (A/V) Bridging, and priority 7 can be used for control traffic, but these usage cases are not meant to restrict the use of each channel. In other DCB implementations, iSCSI traffic can be categorized as LAN traffic in priority 0.

iSCSI-based storage traffic can be treated on the network with these QoS properties associated to the priority value (e.g., priority 4) assigned to iSCSI. Different types or classes of iSCSI storage traffic can exist based on application uses or nature of storage data being transferred. For example asynchronous replication traffic on storage generally has a lower priority than storage traffic for critical application data. The asynchronous replication traffic does not need to have lossless ability and higher prioritization, which the regular storage traffic may need.

SUMMARY OF THE INVENTION

In an embodiment, a method can include setting metadata of a first data packet to have a first priority level based on a first internal classifier of the first data packet and setting metadata of a second data packet to have a second priority level based on a second internal classifier of the second data packet. The first data packet and second data packet can be of the same traffic type (e.g., iSCSI). The method can further include sub-classifying (e.g., the same traffic type), based on the first and second priority levels, to direct the first data packet into a first data channel and second data packet into a second data channel for the same traffic type.

In an embodiment, the first data channel and second data channel each can correspond with a priority level. The first data channel and second data channel can be connected to at least one storage system. In an embodiment, the first data channel and second data channel each can correspond to a unique priority level.

In an embodiment, the method can further include configuring the first data channel and second data channel to provide different amounts of bandwidth. The method can also include configuring the first data channel and second data channel to be at least one of lossless and lossy. A lossless channel uses that link level flow control such as IEEE 802.1Qbb Priority-based Flow Control, and avoids frame discards due to congestion. A lossy channel discards frames, by a switch, during periods of congestion.

In an embodiment, the first data packet and second data packet can be among a plurality of data packets. Each data packet with a header can indicate a priority level. The first data channel and second data channel can be among a plurality of data channels. Each data channel can correspond to a priority level. The first data channel and second data channel can be configured under a Data Center Bridging (DCB) protocol. The DCB (DCBX) protocol can also be a Data Center Bridging eXchange protocol.

In an embodiment, the same traffic type can be iSCSI.

In one embodiment, a system can include a metadata generation module configured to set metadata of a first data packet to have a first priority level based on a first internal classifier of the first data packet and set metadata of second data packet to have a second priority level based on a second internal classifier of the second data packet. The first data packet and second data packet can be of the same traffic type (e.g., iSCSI). The system can also include a transmission module configured to sub-classify, based on the first and second priority levels, to direct the first data packet into a first data channel and second data packet into a second data channel.

In an embodiment, the transmission module is within a storage system. The transmission module can be configured to sub-classify data packets in response to a read request for the same traffic type (i.e. iSCSI).

In another embodiment, a non-transitory computer-readable medium can be configured to store instructions for sub-classifying data of a same traffic type. The instructions, when loaded and executed by a processor, can cause the processor to set metadata of a first data packet to have a first priority level based on a first internal classification of the first data packet and set metadata of a second data packet to have a second priority level based on a second internal classification of the second data packet. The first data packet and second data packet can be of the same traffic type (e.g., iSCSI). The instructions can further cause the processor to place, based on the first and second priority levels, the first data packet into a first data channel and second data packet into a second data channel.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
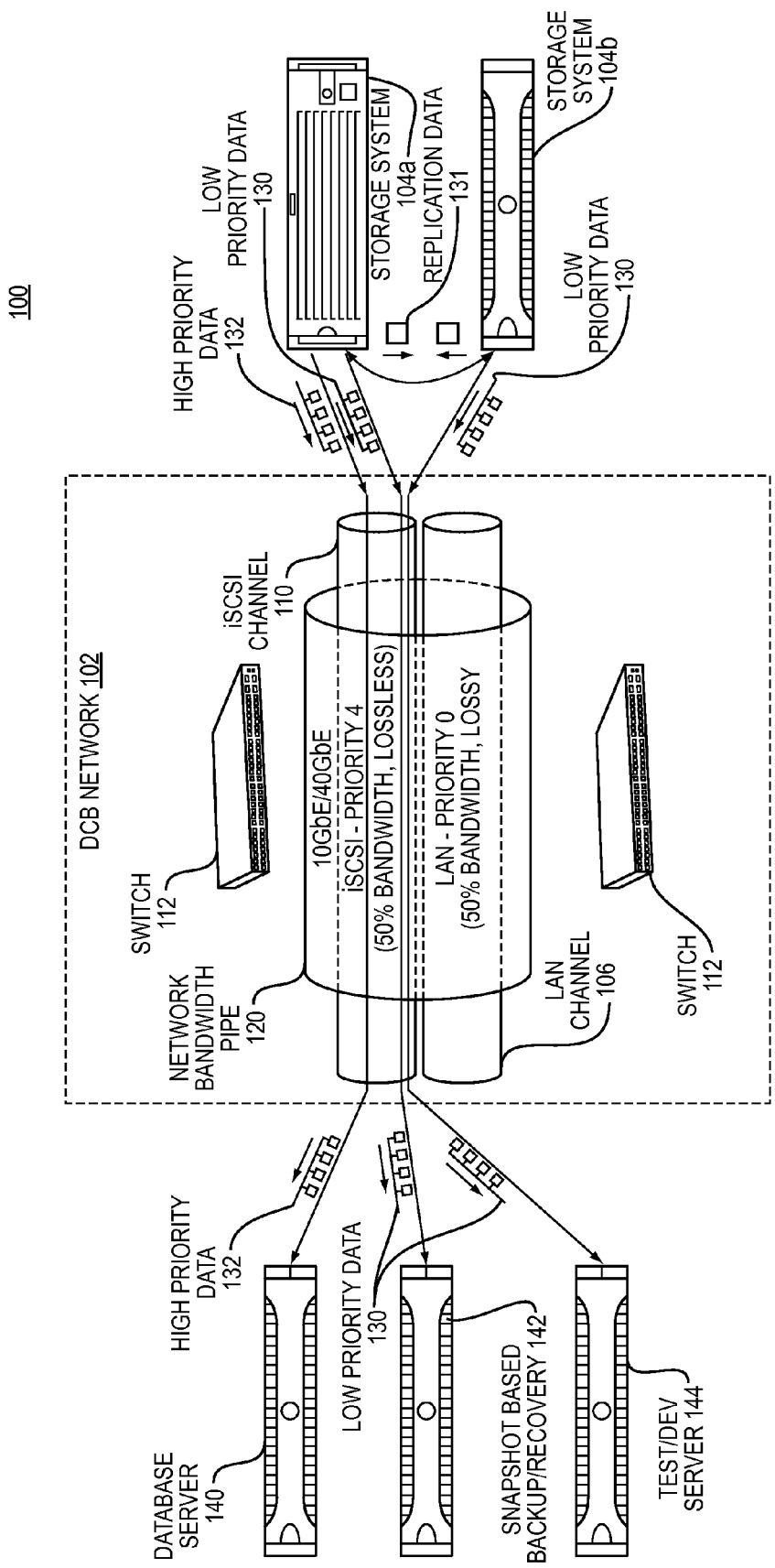
FIG. 1 is a block diagram illustrating prior embodiments of DCB networks.

FIG. 1 is a block diagram 100 illustrating prior embodiments of DCB networks. Storage systems 104a-b are operatively coupled to communicate with a database server 140, a snapshot based backup/recovery server 142 and a testing/development server 144 over a DCB Network 102. The DCB network 102 includes an aggregated network bandwidth pipe 120, which can provide a given amount of bandwidth, for instance, 10 Gigabit Ethernet (GbE)/40 GbE. The DCB network includes at least one switch 112, which physically connects the storage systems 104a-b and servers 140, 142, and 144 to implement the aggregated network bandwidth pipe 120 and LAN channel 106 and iSCSI channel 110. The DCB network 102 can configure the bandwidth pipe to be divided among a LAN channel 106 and an iSCSI channel 110. The LAN channel 106 is configured to be on priority 0 of the DCB Network 102, be allocated 50% of the bandwidth of the bandwidth pipe 120 and be a lossy connection. The iSCSI channel is configured to be on priority 4 of the DCB Network 102, be allocated 50% of the bandwidth of the bandwidth pipe 120, and be a lossless connection. The number of the priority (e.g., LAN being priority 0 and iSCSI being priority 4) does not necessarily reflect the importance of the traffic, but is rather an index or label used to identify traffic, and prioritize it based on the properties of the given channel (e.g., LAN Channel 106 and iSCSI channel 110). However, priorities can be configured such that a higher priority index or label has a channel with a higher priority configuration.

Storage system 104a sends high priority data 132 to a database server 140 over the DCB network 102. Storage system 104a also sends low priority data 130 to the snapshot based backup/recovery server 142 over the DCB network 102. Storage system 104b also sends the low priority data 130 to a testing/development server 144. Storage systems 104a-b can further send replication data 131, from one storage system (e.g., storage system 104a) to another storage system (e.g., storage system 104b). High priority data 132, low priority data 130, and replication data 131 are all iSCSI data, and therefore have priority 4 tags. Therefore, the DCB network 102 sends high priority data 132, low priority data 130 and replication data 131 over the iSCSI channel 110, and therefore high priority data 132 shares bandwidth with low priority data 130 and replication data 131. Further, both the high priority data 132, low priority data 130 and replication data 131 are sent over a lossless channel, when the low priority data 130 and replication data 131 could instead use a lossy channel, but the high priority data 132 requires a lossless channel.

In previous versions, network identifiers in the frame (e.g., Media Access Control (MAC), Virtual Storage Area Network (VSAN), Zone, Virtual Local Area Network (VLAN), etc.) can statically identify devices on the storage area network (SAN) and a corresponding QoS policy is assigned to them on the network. This can statically provide QoS for flows between identified devices. Packet inspection at the network level (e.g., protocol, address identifiers) can dynamically identify packets and provide corresponding QoS. However, packet inspection methods cannot differentiate between traffic within a protocol (i.e. differentiate between a low priority iSCSI packet and a high priority iSCSI packet based on the types of flows discussed earlier). Dynamic methods based on software-defined networking (SDN) require a controller application/device or an external entity to identify a flow between devices and configure QoS dynamically. Differentiating traffic within a protocol based on SDN requires end-devices to communicate the nature of traffic to its controller.

There is a need to provide different QoS levels for iSCSI storage data. Without this differentiation, low priority storage traffic competes with the high priority storage traffic for network resources. Such competition may lead to degradation of response times for high priority storage traffic in times of network congestion. In a worst case congestion scenario, the DCB network may have starvation (e.g., due to HOL blocking) of high priority storage traffic, which can impact critical applications.

U.S. Pat. No. 8,203,950 by Cometto et al., "Quality Of Service In A Storage Area Network" suggests manually setting QoS properties for flows between devices in a Storage Area Network (SAN), but does not teach or suggest establishing flows within a traffic type. U.S. Pat. No. 7,908,410 by Gildfind et al., "Method For Empirically Determining A Qualified Bandwidth Of File Storage For A Shared Filed System Using A Guaranteed Rate I/O (GRIO) Or Non-GRIO Process" suggests reservation of bandwidth and U.S. Pat. No. 7,590,775, Gildfind et al., "Method For Empirically Determining A Qualified Bandwidth Of File Storage For A Shared Filed System" both suggest devices maintaining bandwidth reservations on the target storage controller. U.S. Pat. Pub. No. 2013/0117286, Gallant et al., "Primary Data Storage System With Quality Of Service" suggests allocating QoS for individual volumes within target storage systems. U.S. Pat. Pub. No. 2008/0177881, Endebrock et al., "System And Method For Applying Quality Of Service (QoS) In iSCSI Through iSNS" suggests setting QoS for initiators on an Internet Storage Name Service (iSNS) server such that targets and initiators adhere to the QoS while sending traffic. U.S. Pat. Pub. No. 2010/0165841, Barzilai et al., "Quality Of Service For iSCSI" suggests using rate limiters and queues on target/initiators at the TCP and iSCSI layers. The entire teachings of the above applications are incorporated herein by reference.

In an embodiment of the present invention, a plurality of priorities are configured for iSCSI in DCB network. For example, one priority (e.g., DCB Priority 4) can be marked for iSCSI via Data Center Bridging eXchange (DCBX) application priority. Another priority (e.g., DCB priority 5) can be marked for a custom protocol via DCBX application priority. Priority 4 can be provided a given bandwidth capacity and lossless ability (e.g., Priority-based Flow Control (PFC) On). Priority 5 can be provided a given bandwidth capacity and no lossless ability (PFC Off).

An embodiment of the present invention can provide multiple iSCSI DCB QoS lanes on the network via custom DCBX application priority mapping. An embodiment of the present invention further allows a Dell target storage device to learn the additional custom iSCSI QoS lanes. A further embodiment of the present invention dynamically allows target storage to map traffic to the iSCSI lanes based on internal classifiers/data heuristics such as tiers with hot data/cold data, replication data, snapshot read data and user indicated initiator.

Figure 2:
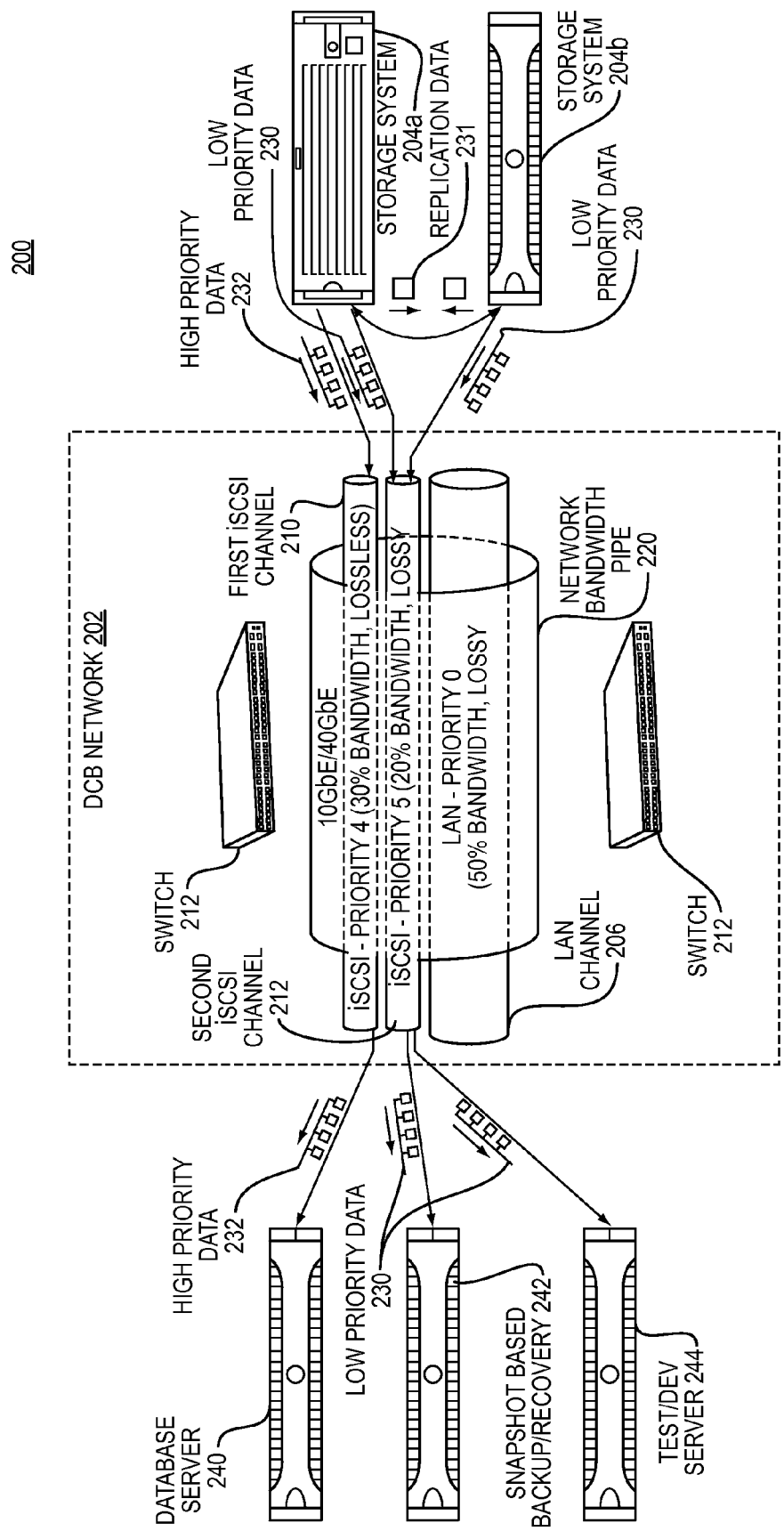
FIG. 2 is a block diagram illustrating an example embodiment of a DCB network implemented in an embodiment of the present invention.

FIG. 2 is a block diagram 200 illustrating an example embodiment of a DCB network 202 implemented in an embodiment of the present invention. Storage systems 204a-b are operatively connected to communicate to a database server 240, snapshot based backup/recovery server 242 and testing/development server 244 over the DCB network 202. The DCB network 202 is implemented with a switch 212, which provides a bandwidth pipe 220, similar to the bandwidth pipe 120 described in relation to FIG. 1.

In relation to FIG. 2, the DCB network 202 can logically divide the bandwidth pipe 220 into a first iSCSI channel 210, a second iSCSI channel 212, and a LAN channel 206. The LAN channel 206, like the LAN channel 106 of FIG. 1, is assigned priority 0, allocated 50% of the bandwidth of the bandwidth pipe 220, and is a lossy connection (or service). The first iSCSI channel 210 is assigned priority 4, allocated 30% of the bandwidth of the bandwidth pipe 220, and is a lossless connection. The first iSCSI channel is configured to receive high priority iSCSI traffic, such as high priority data 232, which is why it is configured to receive 30% of the bandwidth pipe 220 and be a lossless connection. The second iSCSI channel 212 is assigned priority 5, allocated 20% of the bandwidth pipe 220, and is a lossy connection. The second iSCSI channel is configured to receive lower priority iSCSI traffic, such as asynchronous replication data 231, which is why it is configured to receive 20% of the bandwidth pipe 220 (e.g., less than the first iSCSI channel 210, which receives high priority iSCSI traffic) and is a lossy connection.

The number of the priority (e.g., LAN being priority 0 and iSCSI being priority 4 or 5) does not necessarily reflect the importance of the traffic, but is rather an index or label used to identify traffic, and prioritize it based on the properties of the given channel (e.g., LAN Channel 206, first iSCSI channel 210 and second iSCSI channel 212). However, priorities can be configured such that a higher priority index or label has a channel with a higher priority configuration.

Storage system 204a sends high priority data 232 over the DCB network 202 to the database server 240. The high priority data 232 is iSCSI data, and being high priority data 232, it is assigned priority 4, so it is sent over the first iSCSI channel 210. Therefore, high priority data 232 is sent over a lossless connection with additional bandwidth.

Storage systems 204a-b also send asynchronous replication data 231 and low priority data 230 over the DCB network 202 to the snapshot based backup/recover server 242 and the testing/development server 244. Asynchronous replication data 231 and low priority data 230 is low priority, so it is assigned priority 5 and sent over the second iSCSI channel 212. Therefore, the low priority data 230 is sent over a lossy connection with less bandwidth compared to the first iSCSI channel.

The storage systems 204a-b analyze the packets before sending them to tag them priority 4 or priority 5. All DCB capable host initiator devices on the network understand iSCSI application priority and send iSCSI storage requests to storage targets using priority 4. Target storage devices understand both the custom priority 5 and iSCSI priority 4. Based on the type of data being served, the target device can dynamically choose either priority 4 or 5 for sending iSCSI data responses. The dynamic identifiers for storage to make this decision include:

1) Storage tiers. Storage systems automatically tier data based on frequency of access using various algorithms. For example, high frequency data on a solid state drive can be compared to low frequency data stored a spindle based hard drive. Data on the higher tiers are frequently accessed by applications and benefit from low response times and losslessness/no loss. Hence, such data is sent back with iSCSI priority 4 automatically by the target storage device. Data on lower tiers are sent back with the other priority 5.

2) Asynchronous replication traffic is sent from the target storage device on the lower priority 5.

3) Read requests for snapshots are sent from the target storage device on lower priority 5 because the read request is likely a backup or recovery operation using snapshot, and not a high priority data request.

4) Other classifiers can also affect the iSCSI channel data is sent on.

In addition, a static method can allow an administrator to register a network priority for host devices at the storage device, as part of host access configuration mechanism (Access Control List (ACL) registration). Server initiators can be identified by unique identifiers such as IP addresses, iSCSI Qualified Name (IQN), WWN, Ethernet MAC. Thus a server initiator can be assigned a static priority within storage as part of ACL registration.

Host write data requests to target device are sent at the higher priority 4 and to maintain integrity of data writes to storage. Only read data from storage back to hosts is differentiated. The embodiment of the present invention is still effective because 70% of storage traffic in data centers are read I/O.

iSCSI traffic on priority 5 relies on Transmission Control Protocol (TCP) for loss and error recovery. In the worst case, this traffic can experience high latencies due to TCP retransmissions.

One benefit of embodiments of the present invention is that low priority traffic does not consume network resources during periods of high traffic and congest high priority storage traffic. Another benefit of embodiments of the present invention is that it reduces the probability for HOL blocking on the iSCSI priority with PFC enabled.

Figure 3A:
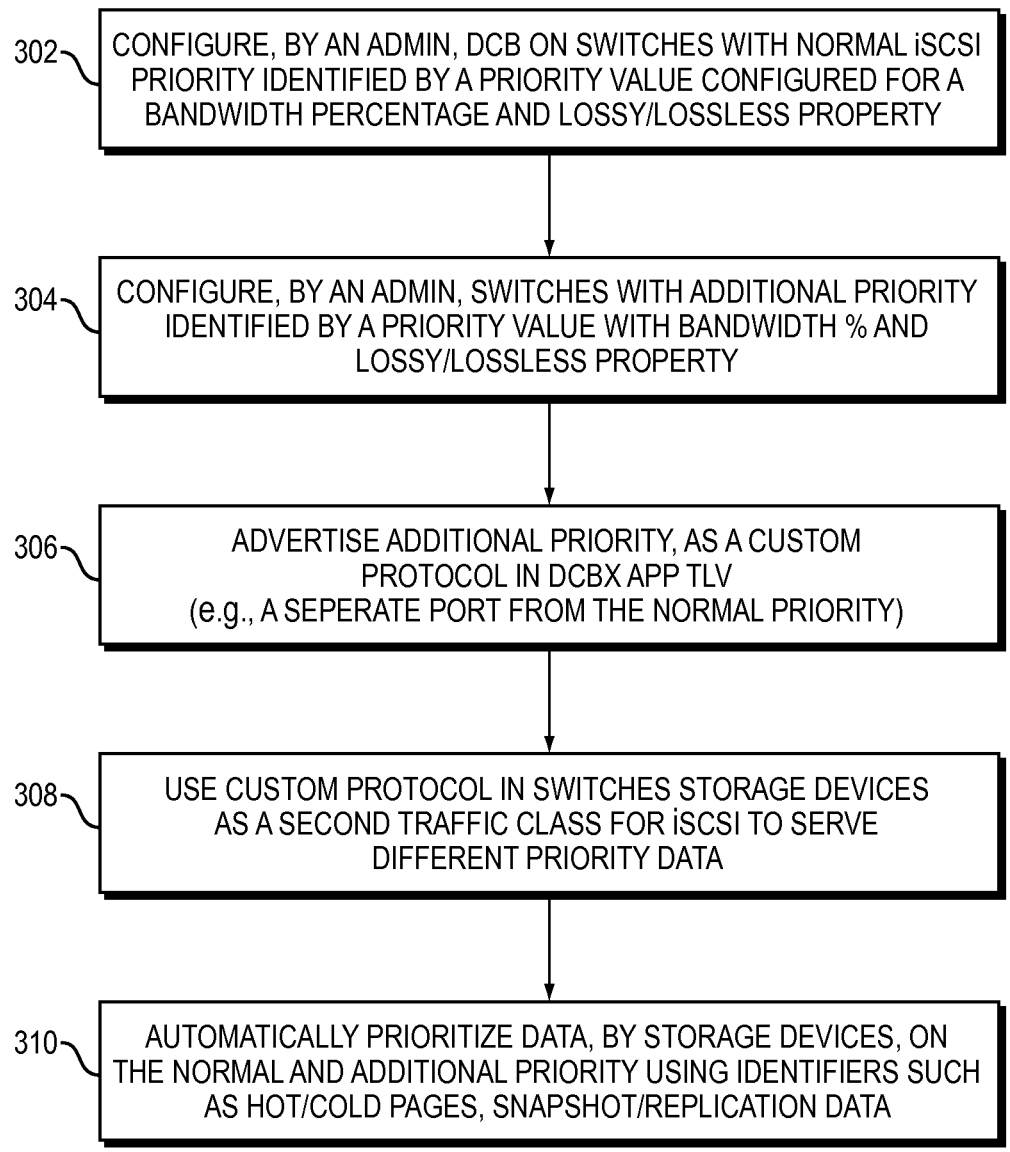
FIG. 3A is a flow diagram illustrating an example embodiment of a process employed by the present invention.

FIG. 3A is a flow diagram 300 illustrating an example embodiment of a process employed by the present invention. First, an administrator configures switches of a DCB network to direct normal iSCSI traffic (e.g., high priority traffic) along a channel with a given bandwidth percentage and to be a lossless channel (302). For example, this channel can be priority 4. Then, the administrator configures the switches of the DCB network to have an additional priority for low priority iSCSI traffic with another bandwidth percentage and a lossy connection (304). For example, this can be priority 5. The administrator can, in other embodiments, configure more than two channels, each with different requirements for different traffic types.

The administrator then configures the switches of the DCB to advertise the custom protocol (e.g., priority 5) in DCBX Application Priority Type-Length-Value (306) to storage target systems. This instructs the storage system to use a different priority value for low priority iSCSI traffic. Therefore, priority 4 traffic can be used for high priority traffic, but priority 5 is used for low priority traffic.

The switch and storage devices, then uses the custom protocol as a second traffic class for iSCSI to serve different priority data, such as asynchronous replicas and snapshot data (308) and other low priority data. Storage devices then automatically prioritize data on the normal and additional priority using identifiers/classifiers such as hot/cold pages, snapshot/replica data, or by using heuristics and analytics (310). Therefore, when storage devices send data across the DCB network, for instance in response to read requests, the data is sent over the appropriate iSCSI sub-channel.

The system taught herein can be used for sub-channels of data transfer types other than iSCSI, for instance, for Fibre-Channel, VoIP, or control traffic. While IEEE 802.1Q provides eight lanes for eight priorities (e.g., 0-7) other embodiments of the invention could provide more or less lanes for additional channels and sub-channels.

Figure 3B:
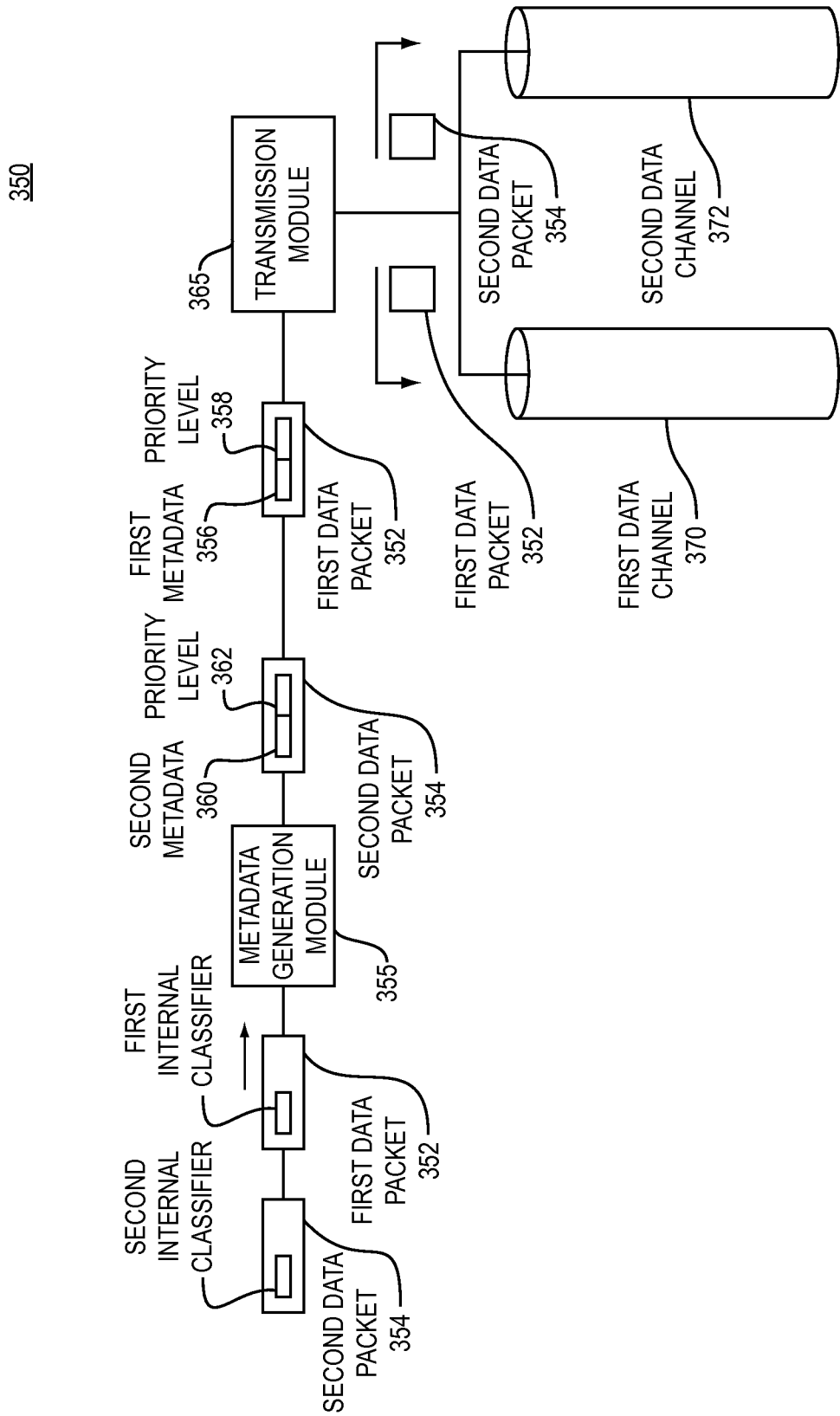
FIG. 3B is a block diagram illustrating an example embodiment of a system employed by the present invention.

FIG. 3B is a block diagram illustrating an example embodiment of a system employed by the present invention. A metadata generation module 355 receives a first data packet 352 and second data packet 354 of the same traffic type (e.g., both of iSCSI). The metadata generation module 355 sets a first metadata 356 of the first data packet 352 to have a first priority level 358 and a second metadata 360 of the second data packet 354 to have a second priority level 362. The metadata can be, for example, a header, footer, or other metadata.

A transmission module 365 receives the first data packet 352 and second data packet 354 with the set first metadata 356 and set second metadata 360, respectively. The transmission module 365 then sub-classifies the first data packet 352 into a first data channel 370 and the second data packet 354 into a second data channel 372 based on the priority level 358 of the first metadata 356 of the first data packet 352 and the priority level 362 of the second metadata 360 of the second data packet 354. The first data channel 370 and second data channel 372 are configured to receive the same traffic type, but have different properties, such as bandwidth percentage of an aggregate network bandwidth pipe and requirements for lossy/lossless transport.

Figure 4:
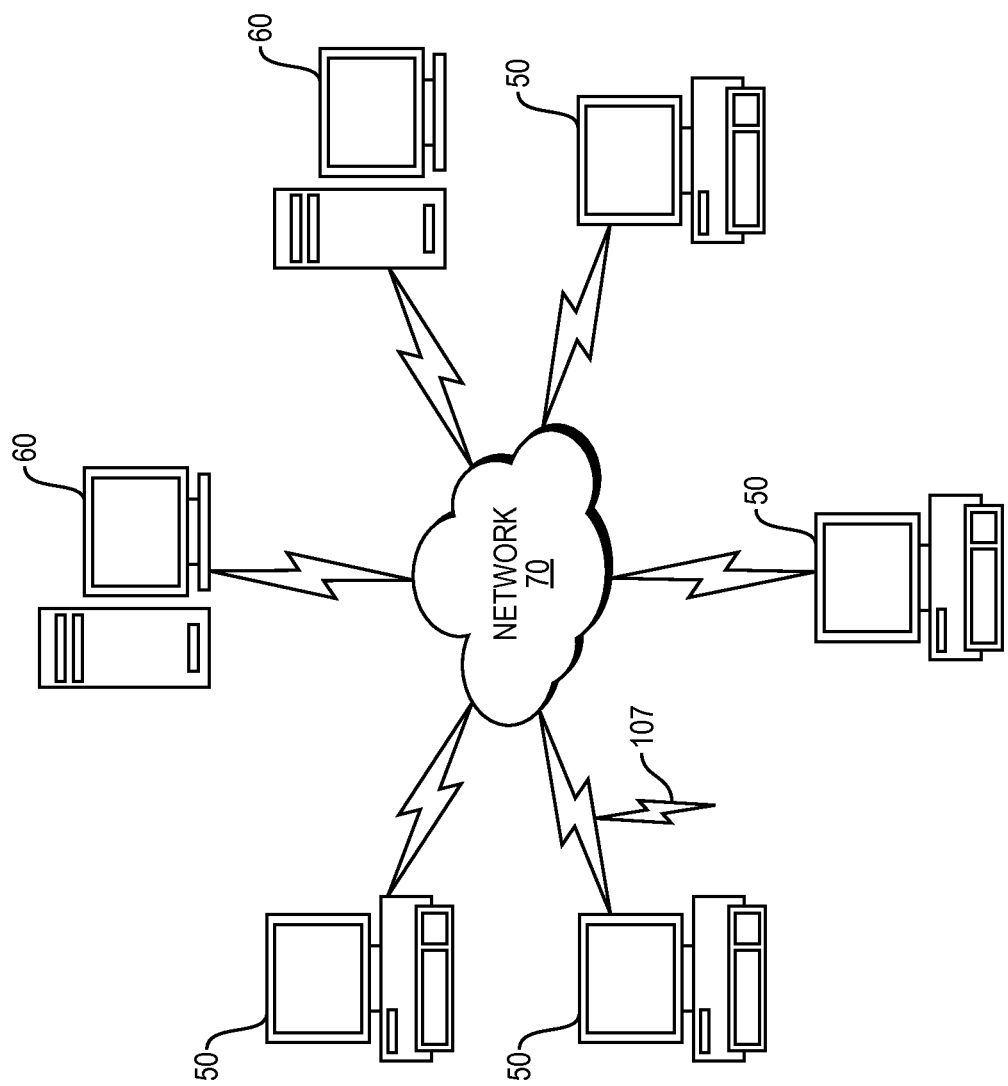
FIG. 4 illustrates a computer network or similar digital processing environment in which embodiments of the present invention may be implemented.

FIG. 4 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 5:
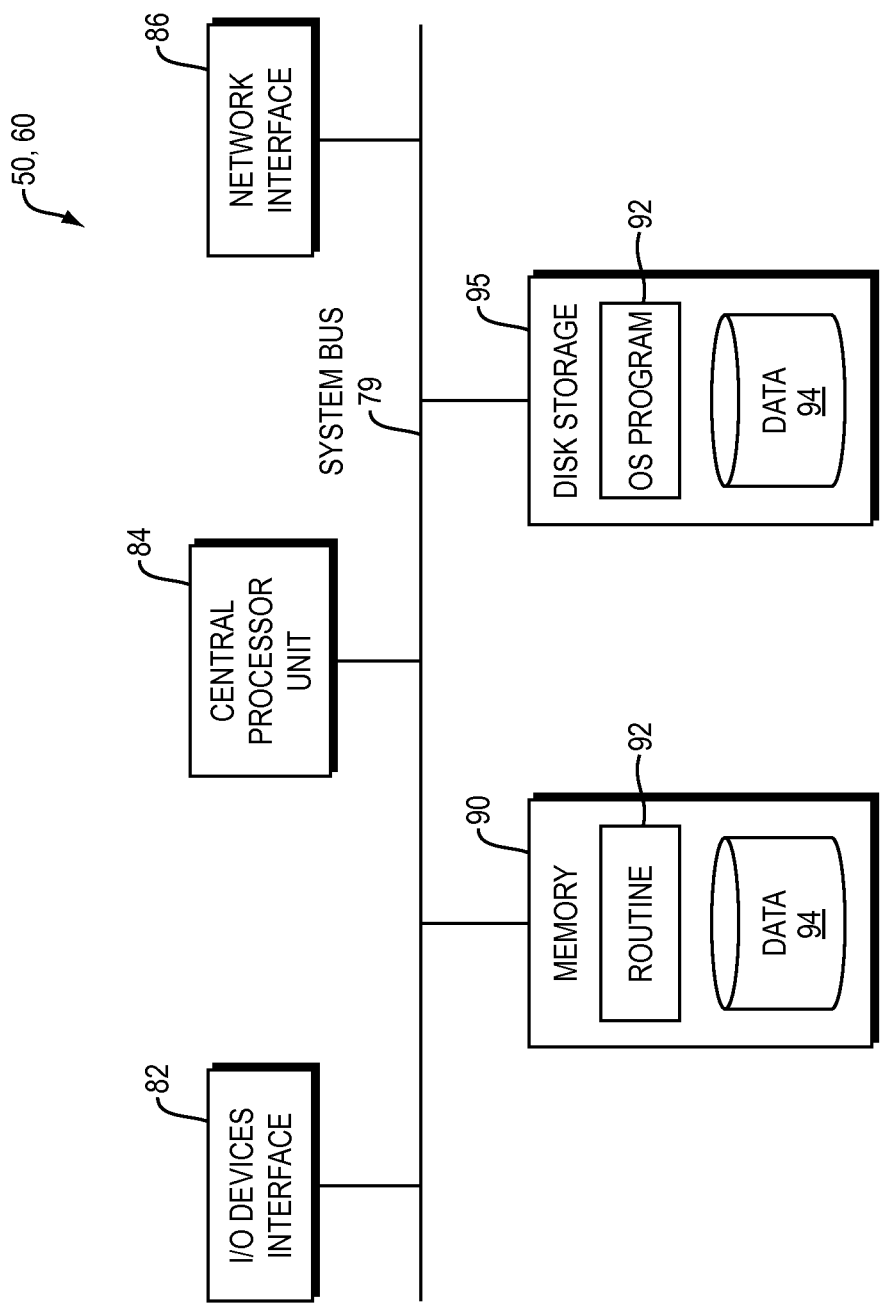
FIG. 5 is a diagram of an example internal structure of a computer (e.g., client processor/device or server computers) in the computer system of FIG. 4.

FIG. 5 is a diagram of an example internal structure of a computer (e.g., client processor/device 50 or server computers 60) in the computer system of FIG. 4. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 4). Memory 90 provides volatile storage for computer software instructions 92 and data 94 used to implement an embodiment of the present invention (e.g., structure generation module, computation module, and combination module code detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

In alternative embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:

receiving a stream of Internet Small Computer System Interface (iSCSI) traffic type data packets;

automatically prioritizing a first data packet of the stream of iSCSI traffic type data packets by setting metadata of the first data packet to have a first priority level based on a first internal classifier of the first data packet, the first internal classifier indicating the first data packet is application data;

automatically prioritizing a second data packet of the stream of iSCSI traffic type data packets by setting metadata of the second data packet to have a second priority level based on a second internal classifier of the second data packet, the first priority indicating a higher priority relative to the second priority, and the first and second internal classifiers indicating at least one of: (a) storage tiers of data in the respective first data packet and second data packet, (b) whether data of the first data packet or second data packet is replication data or a read request for a snapshot, and (c) a static priority assigned to a host; and directing the first data packet and second data packet into a network bandwidth pipe having a plurality of data channels, a subset of the plurality of data channels being available for other traffic types than the iSCSI traffic type;

sub-classifying the first data packet into a first iSCSI traffic type data channel of the network bandwidth pipe assigned to the first priority level and sending the first data packet to its destination; and sub-classifying the second data packet into a second iSCSI traffic type data channel of the network bandwidth pipe assigned to the second priority level, the second data channel configured to have less bandwidth than the first data channel and sending the second data packet to its destination.

2. The method of claim 1, wherein the first data channel and second data channel are connected to at least one storage system, the at least one storage system serving the same iSCSI traffic type.

3. The method of claim 1, further comprising configuring the first data channel and second data channel to provide different amounts of bandwidth for corresponding priority levels of the same iSCSI traffic type.

4. The method of claim 1, further comprising configuring the first data channel and second data channel to be at least one of lossless and lossy for corresponding priority levels of the same iSCSI traffic type.

5. The method of claim 1, wherein the first data packet and second data packet are among a plurality of data packets, each data packet with a header indicating a priority level, and further wherein the first data channel and second data channel are among a plurality of data channels, each data channel corresponding to a priority level for the same iSCSI traffic type.

6. The method of claim 1, wherein the first data channel and second data channel are configured under a Data Center Bridging (DCB) protocol.

7. A system comprising:
a processor; and
a memory with computer code instructions stored therein, the memory operatively coupled to said processor such that the computer code instructions configure the processor to implement:
a metadata generation module configured to:
receive a stream of Internet Small Computer System Interface (iSCSI) traffic type data packets;
automatically prioritize a first data packet of the stream of iSCSI traffic type data packets by setting metadata of the first data packet to have a first priority level based on a first internal classifier of the first data packet, the first internal classifier indicating the first data packet is application data, and
automatically prioritize a second data packet of the stream of iSCSI traffic type data packets of the same traffic type by setting metadata of the second data packet to have a second priority level based on a second internal classifier of the second data packet, the first priority indicating a higher priority relative to the second priority, and the first and second internal classifiers indicating at least one of: (a) storage tiers of data in the respective first data packet and second data packet, (b) whether data of the first data packet or second data packet is replication data or a read request for a snapshot, and (c) a static priority assigned to a host; and
a transmission module configured to:
direct the first data packet and second data packet into a network bandwidth pipe having a plurality of data channels, a subset of the plurality of data channels being available for other traffic types than the iSCSI traffic type;
sub-classify the first data packet into a first iSCSI traffic type data channel of the network bandwidth pipe assigned to the first priority level and sending the first data packet to its destination; and
sub-classify the second data packet into a second iSCSI traffic type data channel of the network bandwidth pipe assigned to the second priority level and sending the second data packet to its destination, the second data channel configured to have less bandwidth than the first data channel.

8. The system of claim 7, wherein the first data channel and second data channel are connected to at least one storage system, the at least one storage system serving same iSCSI traffic type.

9. The system of claim 7, further comprising a user interface module configured to enable configuration of the first data channel and second data channel to provide different amounts of bandwidth for corresponding priority levels of the same iSCSI traffic type.

10. The system of claim 7, further comprising configuring the first data channel and second data channel to be at least one of lossless and lossy for corresponding priority levels of the same iSCSI traffic type.

11. The system of claim 7, wherein the first data packet and second data packet are among a plurality of data packets, each data packet with a header indicating a priority level, and further wherein the first data channel and second data channel are among a plurality of data channels, each data channel corresponding with a priority level for same iSCSI traffic type.

12. The system of claim 7, wherein the first data channel and second data channel are configured under a Data Center Bridging (DCB) protocol.

13. A non-transitory computer-readable medium configured to store instructions for sub-classifying data of a same traffic type, the instructions, when loaded and executed by a processor, causes the processor to:
receive a stream of Internet Small Computer System Interface (iSCSI) traffic type data packets;
automatically prioritize a first data packet of the stream of iSCSI traffic type data packets by setting metadata of the first data packet to have a first priority level based on a first internal classifier of the first data packet, the first internal classifier indicating the first data packet is application data;
automatically prioritize a second data packet of the stream of iSCSI traffic type data packets by setting metadata of the second data packet to have a second priority level based on a second internal classifier of the second data packet, the first priority indicating a higher priority relative to the second priority, and the first and second internal classifiers indicating at least one of: (a) storage tiers of data in the respective first data packet and second data packet, (b) whether data of the first data packet or second data packet is replication data or a read request for a snapshot, and (c) a static priority assigned to a host; and
direct the first data packet and second data packet into a network bandwidth pipe having a plurality of data channels, a subset of the plurality of data channels being available for other traffic types than the iSCSI traffic type;
sub-classify the first data packet into a first iSCSI traffic type data channel of the network bandwidth pipe assigned to the first priority level and sending the first data packet to its destination; and
sub-classify the second data packet into a second iSCSI traffic type data channel of the network bandwidth pipe assigned to the second priority level and sending the second data packet to its destination, the second data channel configured to have less bandwidth than the first data channel.

14. The non-transitory computer-readable medium of claim 13, wherein the first data channel and second data channel are connected to at least one storage system, the at least one storage system serving same iSCSI traffic type.

15. The non-transitory computer-readable medium of claim 13, further comprising configuring the first data channel and second data channel to provide different amounts of bandwidth for corresponding priority levels of the same iSCSI traffic type.

* * * * *